(No Model.)

F. S. BRADLEY.
SAW.

No. 573,812.  Patented Dec. 22, 1896.

UNITED STATES PATENT OFFICE.

FRANK S. BRADLEY, OF NEW HAVEN, CONNECTICUT, ASSIGNOR TO THE WEST HAVEN MANUFACTURING CO., OF WEST HAVEN, CONNECTICUT.

SAW.

SPECIFICATION forming part of Letters Patent No. 573,812, dated December 22, 1896.

Application filed September 12, 1896. Serial No. 605,557. (No model.)

*To all whom it may concern:*

Be it known that I, FRANK S. BRADLEY, of New Haven, in the county of New Haven and State of Connecticut, have invented a new Improvement in Saws; and I do hereby declare the following, when taken in connection with the accompanying drawings and the letters of reference marked thereon, to be a full, clear, and exact description of the same, and which said drawings constitute part of this specification, and represent, in—

Figure 1:
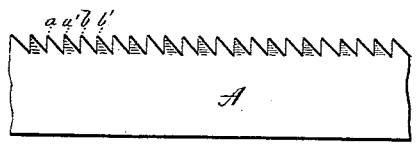
Figure 2:
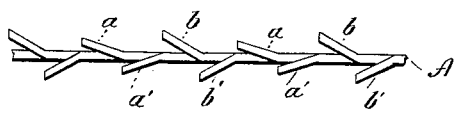

Figure 1, a side view of a saw having teeth set in accordance with my invention; Fig. 2, a view of the cutting edge enlarged.

This invention relates to an improvement in saws, and particularly to that class which are used for sawing metal and commonly called "hack-saws." In the more general construction of saws of this character, all of the teeth project to an equal distance beyond the sides of the saw-blade, and the constant passing of the blade through the kerf wears the outer points of the teeth and to as great an extent when the saw is being moved backward as by the forward or cutting stroke, and as the points of the teeth of the saw become worn, not only is its cutting capacity reduced but the kerf becomes narrower and tends to pinch upon the blade, thus increasing the friction or wear on teeth, and the saw soon becomes useless.

The object of this invention is to arrange the saw-teeth so as to secure the benefit of the cutting action of each tooth upon the bottom of the kerf and reduce the number of teeth that act against the side of the kerf, and hence reduce the friction upon the blade, thus increasing the utility of the blade, which, when the outer teeth become worn, is still serviceable and nearly equal in effectiveness to saws as at present constructed; and the invention consists in the construction as hereinafter described, and particularly recited in the claim.

As shown in the drawings, the teeth are all of equal length and of any desired cut. Alternate pairs of teeth $a$ and $a'$ are set in opposite directions, so that their points project slightly beyond the sides of the blade A, while the intermediate pairs $b$ and $b'$ are also set in opposite directions, but beyond the line of the points of the teeth $a$ and $a'$, so that while the teeth all project downward to an equal distance from the blade A the points of alternate teeth project beyond the points of the intermediate teeth on each side of the blade, as clearly shown in Fig. 2.

In operation all of the teeth of the saw act against the bottom of the kerf so as to cut continuously, while only the alternate teeth cut against the sides of the kerf. When the points of the teeth $b\ b'$ become worn, the points of the teeth $a\ a'$ will cut against the side of the kerf until in turn they become so worn as to render the saw useless. Thus the saw after the points $b\ b'$ are worn away is nearly as useful as the saws of present construction, in which all of the teeth project at an equal distance from the sides of the blade. It may be stated that the teeth $a\ a'$ not only cut against the bottom of the kerf, but also to a greater or less extent divide the material cut by the outer teeth $b\ b'$.

Having thus described my invention, what I claim as new, and desire to secure by Letters Patent, is—

A hack-saw having teeth arranged in pairs and all of equal length, the teeth of alternate pairs being set in opposite directions slightly beyond the sides of the blade, and the intermediate pairs of teeth also set in opposite directions beyond the points of the teeth first mentioned, substantially as described.

In testimony whereof I have signed this specification in the presence of two subscribing witnesses.

FRANK S. BRADLEY.

Witnesses:
 FRED C. EARLE,
 LILLIAN D. KELSEY.